(12) United States Patent
Martin

(10) Patent No.: US 6,510,971 B1
(45) Date of Patent: Jan. 28, 2003

(54) LIQUID DISPENSING CLOSURE

(75) Inventor: Douglas S. Martin, New Castle, PA (US)

(73) Assignee: Weatherchem Corporation, Twinsburg, OH (US)

( * ) Notice: Subject to any disclaimer, the term of this patent is extended or adjusted under 35 U.S.C. 154(b) by 0 days.

(21) Appl. No.: 09/974,484

(22) Filed: Oct. 10, 2001

(51) Int. Cl.[7] ................................................ B65D 47/00
(52) U.S. Cl. .................... 222/556; 222/545; 215/237
(58) Field of Search ................................ 222/556, 545; 215/211, 216, 235, 237, 301; D9/446, 447

(56) References Cited

U.S. PATENT DOCUMENTS

| | | | |
|---|---|---|---|
| 2,851,203 A | | 9/1958 | Nowak |
| D193,121 S | * | 6/1962 | Wickman .................... D9/446 |
| D200,024 S | | 1/1965 | Lombardo .................... D58/26 |
| D247,475 S | | 3/1978 | Newman ..................... D9/253 |
| 4,234,099 A | | 11/1980 | Tarro .......................... 220/269 |
| D265,060 S | * | 6/1982 | Blank ......................... D9/446 |
| 4,693,399 A | | 9/1987 | Hickman et al. ........... 222/480 |
| D292,491 S | | 10/1987 | Ross et al. .................... D9/447 |
| 4,718,567 A | * | 1/1988 | La Vange .................... 215/216 |
| 4,735,334 A | | 4/1988 | Abbott ........................ 220/259 |
| 4,838,441 A | * | 6/1989 | Chernack .................... 215/216 |
| D306,701 S | * | 3/1990 | Beck ............................ D9/446 |
| 4,934,590 A | | 6/1990 | Robichaud et al. ..... 229/125.09 |
| 4,936,494 A | | 6/1990 | Weidman .................... 222/480 |
| D331,877 S | | 12/1992 | Robichaud et al. .......... D9/449 |
| 5,330,082 A | | 7/1994 | Forsyth ....................... 222/480 |
| D355,121 S | | 2/1995 | Kohl ............................ D9/447 |
| 5,499,736 A | | 3/1996 | Kohl .......................... 220/254 |
| 5,579,957 A | | 12/1996 | Gentile et al. ......... 222/153.14 |
| D435,445 S | | 12/2000 | Arai et al. ................... D9/447 |
| D436,040 S | | 1/2001 | Warner et al. ............... D9/449 |

* cited by examiner

Primary Examiner—Henry C. Yuen
Assistant Examiner—Stephanie Willatt
(74) Attorney, Agent, or Firm—Pearne & Gordon LLP

(57) ABSTRACT

A liquid dispensing closure for bottles and the like comprising a one-piece body having an end wall for covering the mouth of the bottle and a depending skirt for threading onto the neck of the bottle. A dispensing aperture in the end wall is surrounded by a spout that affords directional control of a stream of liquid being dispensed and reduced dribbling when dispensing is discontinued. A flap is hinged on the end wall to open and close the aperture with an associated depending plug that fits in the spout. The end wall, spout and hinged flap are arranged in a manner relative to one another that permits the flap to be advantageously molded in an upright position.

23 Claims, 5 Drawing Sheets

LIQUID DISPENSING CLOSURE

BACKGROUND OF THE INVENTION

The invention relates to dispensing closures for containers and, in particular, to dispensing closures for liquids.

PRIOR ART

Injection-molded thermoplastic closures are well-known in the package industry. A popular style of such closures is shown, for example, in U.S. Pat. Nos. 4,693,399, 4,936,494 and 5,330,082. These closures or "caps", typically, are arranged to screw onto a container and have one or more flaps for selectively closing and opening a dispensing aperture in an end wall extending across the mouth of the container. Generally, closures of this type are used for dry granular or particulate materials.

It is known to construct dispensing closures for liquids, for example, from U.S. Pat. No. 6,164,503, but generally their designs have limitations in their utility and/or in the costs and ease of manufacture. Typically, the contents are dispensed by tilting the container fitted with the closure, although some applications can involve discharge of the contents where the container is squeezed or the contents are otherwise pressurized.

It is desirable that a liquid dispensing cap have a spout that gives directional control to the discharge stream and that projects from surrounding surface areas to reduce dribbling when dispensing flow is interrupted.

For economy of manufacture and convenience to the user, it is desirable that the flap or cover that closes the dispensing aperture be molded integrally with the main body of the cap and be connected to the body with an integral living or flexible hinge. For manufacturing economies, it is desirable that the flap be molded in a 90° position relative to the end wall of the cap. This condition is preferred because a relatively large number of parts can, as a result, be molded in a press of a given size. An integral flap, a spout and a 90° flap molding orientation have, until the present invention, been generally mutually incompatible features.

SUMMARY OF THE INVENTION

The invention provides an improved injection-molded one-piece dispensing closure or cap particularly suited for dispensing liquids from a container or bottle on which the cap is assembled. A disclosed cap, constructed in accordance with the invention, has an axially or vertically extending spout that offers directional control of a stream of liquid being dispensed when the container on which the cap is fitted is tilted and a drip resistant structure that reduces dribbling when the bottle is turned upright. The cap includes an integral flap carried on a living hinge. The flap has a projecting plug that fits into the spout with a fluid-tight seal. In a preferred configuration of the cap, an end wall that spans the mouth of the container and supports the dispensing spout is uniquely tilted or stepped from a horizontal reference plane, such as a plane represented by a sealing surface area of the cap that engages the mouth of a container. This inclined or stepped plane of the end wall surrounding the spout enables the cap to be practically molded with limited complexity in the tooling.

DETAILED DESCRIPTION OF THE PREFERRED EMBODIMENTS

Figure 1:
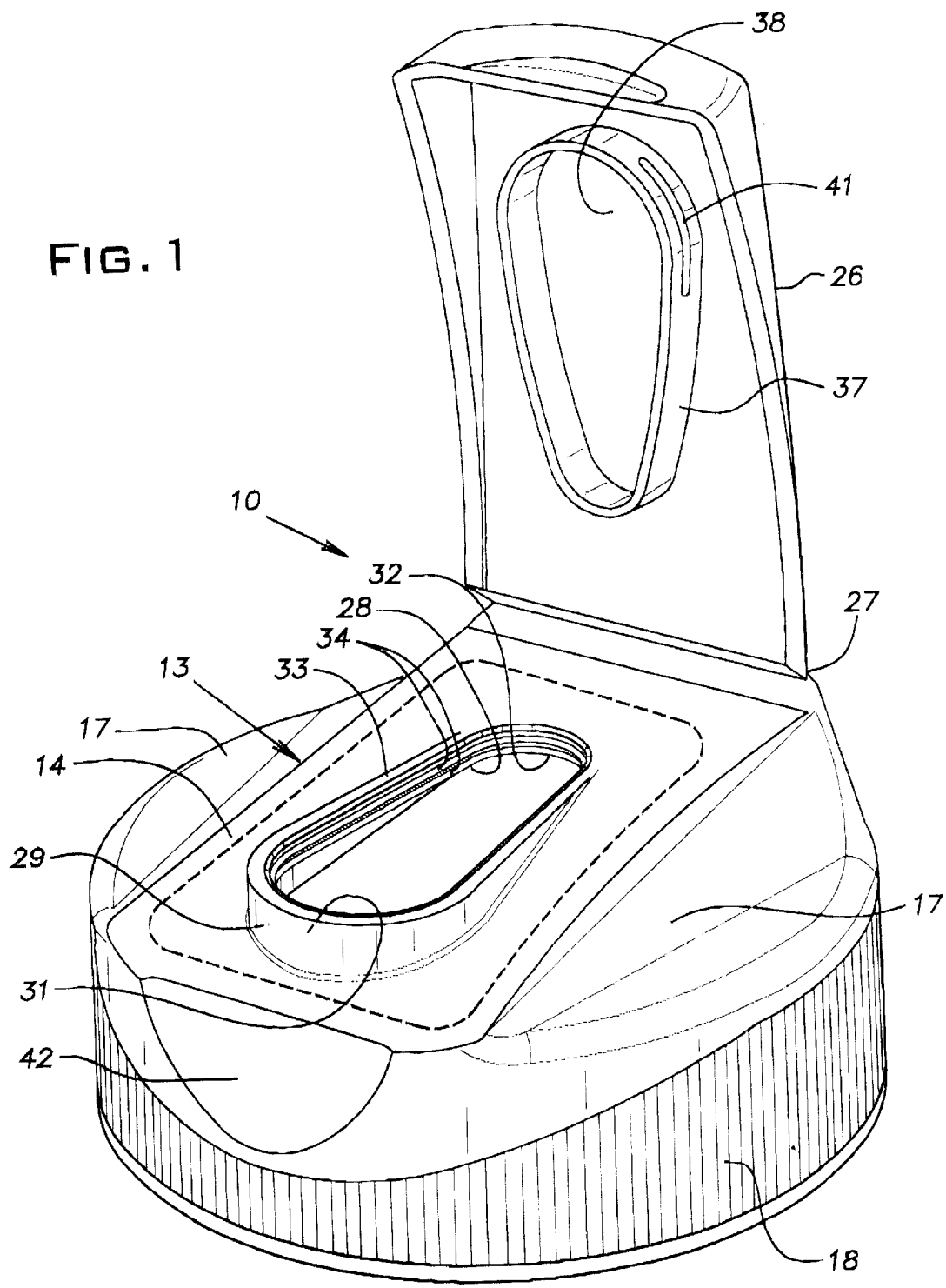
FIG. 1 is a front perspective view of a first embodiment of a cap constructed in accordance with the invention.
Figure 2:
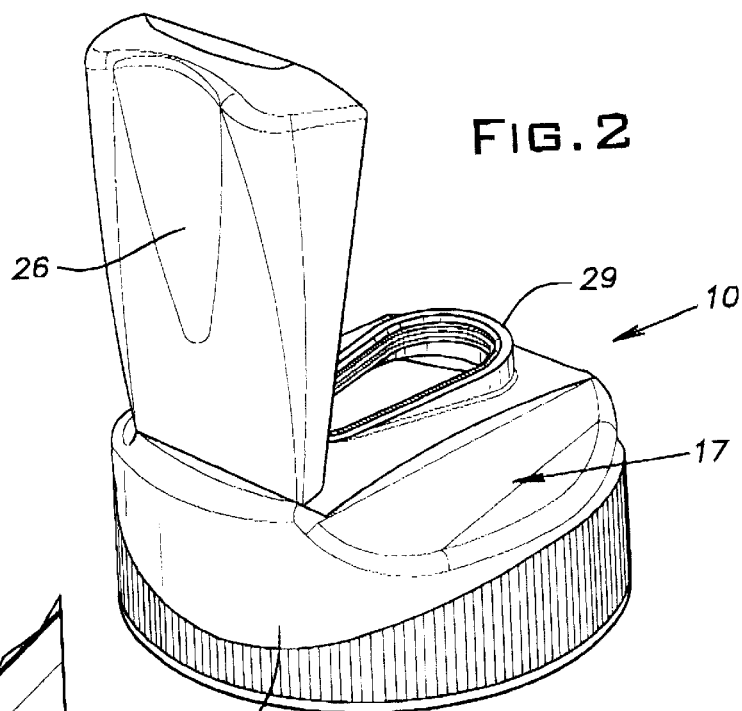
FIG. 2 is a rear perspective view of the cap of FIG. 1.
Figure 3A:
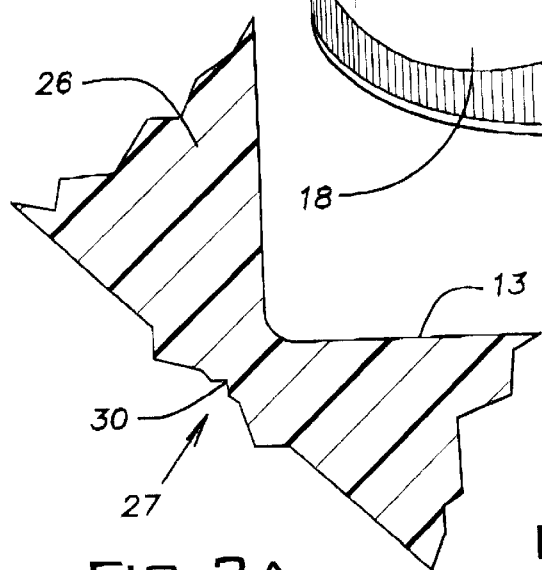
FIG. 3A is a greatly enlarged cross-sectional view of the hinge portion of the cap.
Figure 3:
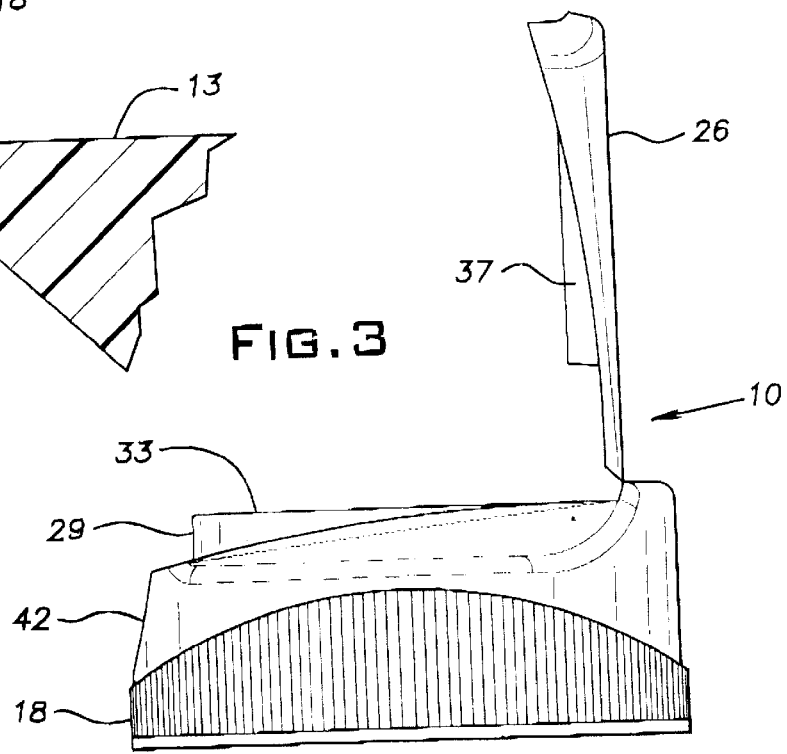
FIG. 3 is a side elevational view of the cap of FIG. 1.
Figure 4:
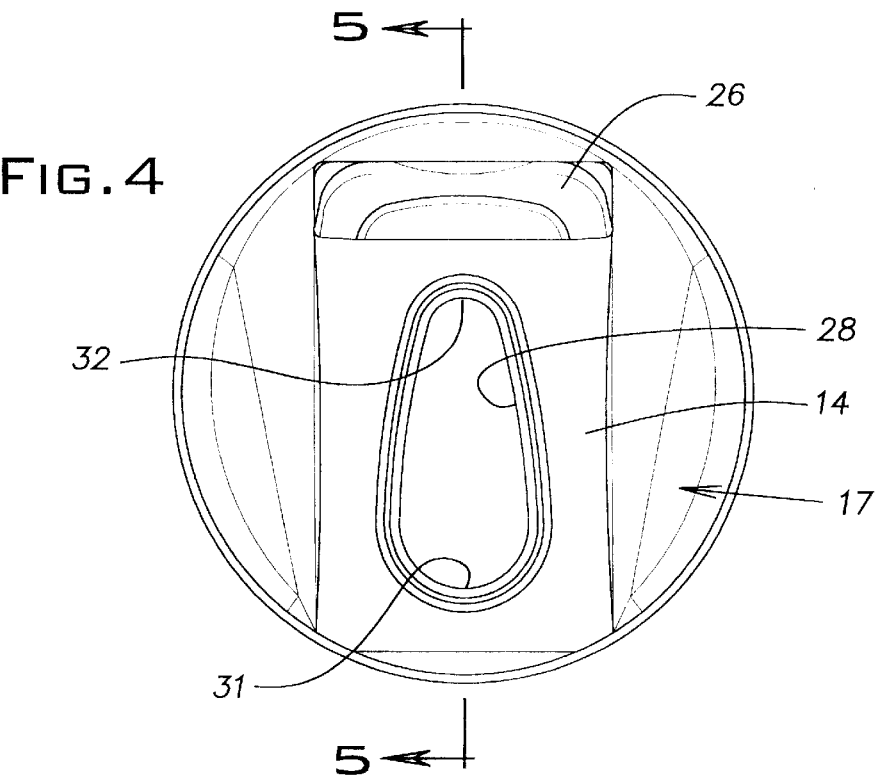
FIG. 4 is a top view of the cap of FIG. 1.

Referring now to the drawings, FIGS. 1–6 illustrate a first embodiment of the invention in the form of a liquid dispensing closure or cap 10. The cap 10 is preferably formed as an integral or one-piece injection-molded product of a suitable thermoplastic material such as polypropylene or other material well-known in the art. It will be understood that ordinarily a cap is installed upright on the top of a container or bottle 11 (FIG. 5) with a mouth 12 that typically lies in a horizontal plane. In the present context, the vertical direction generally corresponds to an axial direction with reference to the geometry of the cap 10 and the horizontal direction or a horizontal plane will be understood to be perpendicular to the axial direction of the cap, i.e. the vertical direction. It will be understood that during molding, discussed below, the cap can have a non-upright orientation but this same reference terminology will be used.

The cap 10 (FIG. 1) has an end wall 13 which, in the illustrated case, comprises an inclined central deck area 14 and lateral transition areas 17. A generally cylindrical hollow or tubular skirt 18 depends from the end wall 13. The interior of the skirt 18 is formed with inwardly projecting screw threads 19 (FIG. 5), adapted to engage complementary threads 21 on the neck 22 of the bottle 11. The exterior of the skirt 18 can be smooth or provided with small vertical grooves or other texture to improve its ability to be gripped by a person's fingers.

A flap or lid 26 is pivotally joined to the end wall 13 by a living hinge 27 that lies in a plane perpendicular to the axis of the cap's cylindrical skirt 18 and has a chordal orientation with respect to the projected or plan area of the end wall 13. The hinge 27 is a relatively thin wall area that is capable of flexing without breaking throughout the expected service life of the cap 10. The hinge 27, preferably, although not necessarily, is characterized by a small indentation or V-shaped notch 30 preferably running the full length of the hinge. The notch 30 forms a weakened area in the compression side of the hinge 27 so that the hinge will fold at precisely the same location from cap to cap, thus assuring repeatability of performance.

The inclined deck 14 of the end wall 13 has a pear-shaped dispensing opening 28 with its narrow end proximal to the hinge 27 and its major end distal from the hinge. Preferably, but not necessarily, the opening or aperture 28 is, in an end or plan view of the cap 10, symmetrical about a longitudinal axis that lies in a plane perpendicular to the hinge and is centered laterally in the cap. A spout 29 forms the boundary of the opening 28. The spout 29 stands vertically or axially up from the end wall 13. In the illustrated example, the spout has its greatest axial extension or height above the end wall central deck 14 at a major end 31 of the dispensing opening distal from the hinge. This height is, preferably, about at least twice the nominal wall thickness of the cap. The illustrated cap with a 38 mm nominal diameter has a nominal wall thickness of 0.050 in. At a minor proximal end 32 (relative to the hinge) of the dispensing opening, the spout 29 merges into the plane of the upper or exterior surface of the end wall so that it has no height above the end wall in this area. However, if desired, the spout could extend above the end wall at this location as will be appreciated from an understanding of the discussion below. Preferably, although not necessarily, as shown, an upper edge 33 of the spout 29 lies in a horizontal plane. A pair of axially spaced sealing ribs 34 extend continuously along the inner periphery of the spout 29 parallel to the plane of the upper edge 33. The wall forming the spout 29 depends somewhat below the plane of the end wall at the minor end 32 of the opening 28 to provide adequate axial space for the sealing beads 34. As shown, wall areas of the spout 29 are generally vertically or axially oriented apart from any necessary or desired draft.

Figure 6:
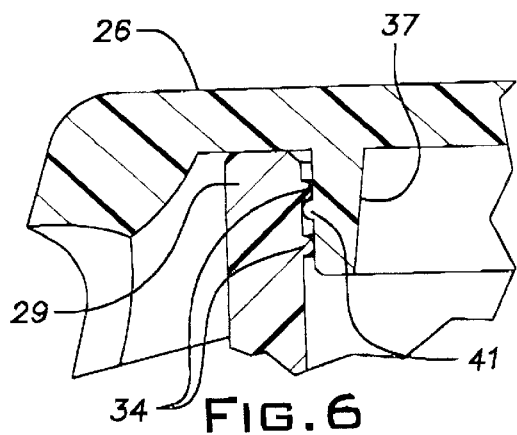
FIG. 6 is an enlarged, fragmentary cross-sectional view of the cap of FIG. 1 showing a flap plug in fluid-tight sealing engagement with a pour spout.

The flap 26 has a generally rectangular profile in plan view (when closed) and is somewhat hood-shaped at its distal end (with reference to the hinge 27). Located on the underside of the flap 26 is a depending wall 37 having a curvilinear configuration that is complimentary to the dispensing aperture or opening 28 and the interior of the spout 29. The wall 37, with a portion 38 of the flap 28 it circumscribes, forms a hollow plug capable of closing the aperture 28 in a fluid-tight manner. More specifically, when the flap 26 is closed against or adjacent the end wall 13 the depending plug wall 37 enters the spout 29 and its outside surface is engaged by the sealing beads or ribs 34 with a fluid-tight engagement. The wall 37 may be beveled at its lower outer edge to assist in closing action when it is pressed into the spout 29. Projecting rib segments 41 on the outer surface of the plug wall 37 are positioned and proportioned to snap into the vertical or axial space between the sealing beads 34 to frictionally releasably hold the flap 26 in a closed position by an interference fit between the upper bead 34 and the ribs 41 (FIG. 6).

A shallow recess 42 is molded in the skirt 18 diametrically opposite the hinge 27 to afford a finger or fingernail grip under the distal edge of the flap. Moderate upward pressure applied to the underside of the flap 26 will overcome the retention forces of the ribs 41 and sealing bead 34 and friction between the plug wall 37 and the sealing beads 34.

Figure 5A:
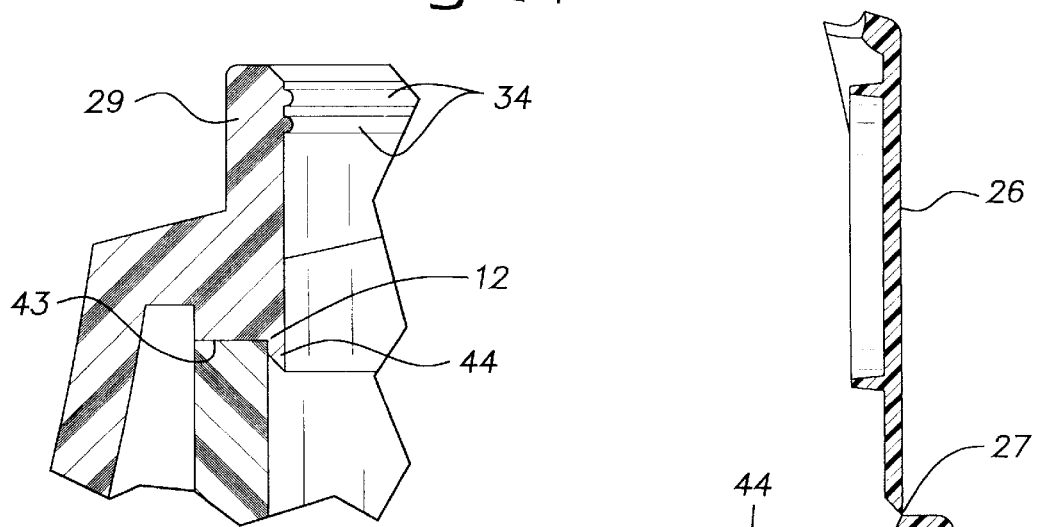
FIG. 5a is an enlarged fragmentary view of the cap corresponding to an area of FIG. 5.
Figure 5:
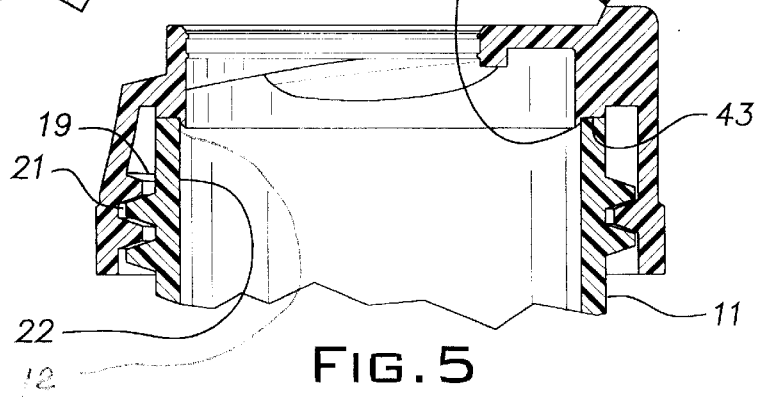
FIG. 5 is a cross-sectional view of the cap of FIG. 1 taken in a vertical plane through the center of the cap.

With reference to FIGS. 5 and 5a, the illustrated cap 10 has on the underside of its end wall 13 a peripheral circumferentially continuous annular surface 43 lying in a horizontal or radial plane and an axially depending lip 44. The lip or wall 44 can be beveled slightly so that it becomes radially smaller with distance from the end wall 13. The depending lip or wall 44 is situated and proportioned on the end wall 13 so that when the cap 10 is fully tightened on a bottle 11, it fits into the mouth 12 of the bottle in a plug-like manner to effect a fluid-tight seal with an inner surface of the mouth 12. This plug-like construction is particularly suited for use with an injection blow molded plastic bottle. Alternatively, the lip 44 can be omitted and the annular surface 43 can effect a seal on the upper edge of the bottle mouth 12. If desired, a sealing membrane such an induction seal liner known in the art can be interposed across the mouth 12 and pressed between the surface 43 and the upper edge of the bottle mouth.

The aperture 28 and spout 29 are particularly useful for dispensing liquids from a container. The aperture/spout geometry allows high discharge rates without glugging. This is achieved by the relatively high location of the proximal or minor end of the aperture 28 which readily admits air into the container to replace the volume of liquid that is being discharged without a great risk that the liquid will rise above this end of the aperture as the container is tilted for dispensing. The spout 29, additionally, serves to confine a stream of liquid being dispensed so that it affords good directional control. Further, the spout 29 serves to reduce dribbling when the container is uprighted to discontinue dispensing.

Figure 9:
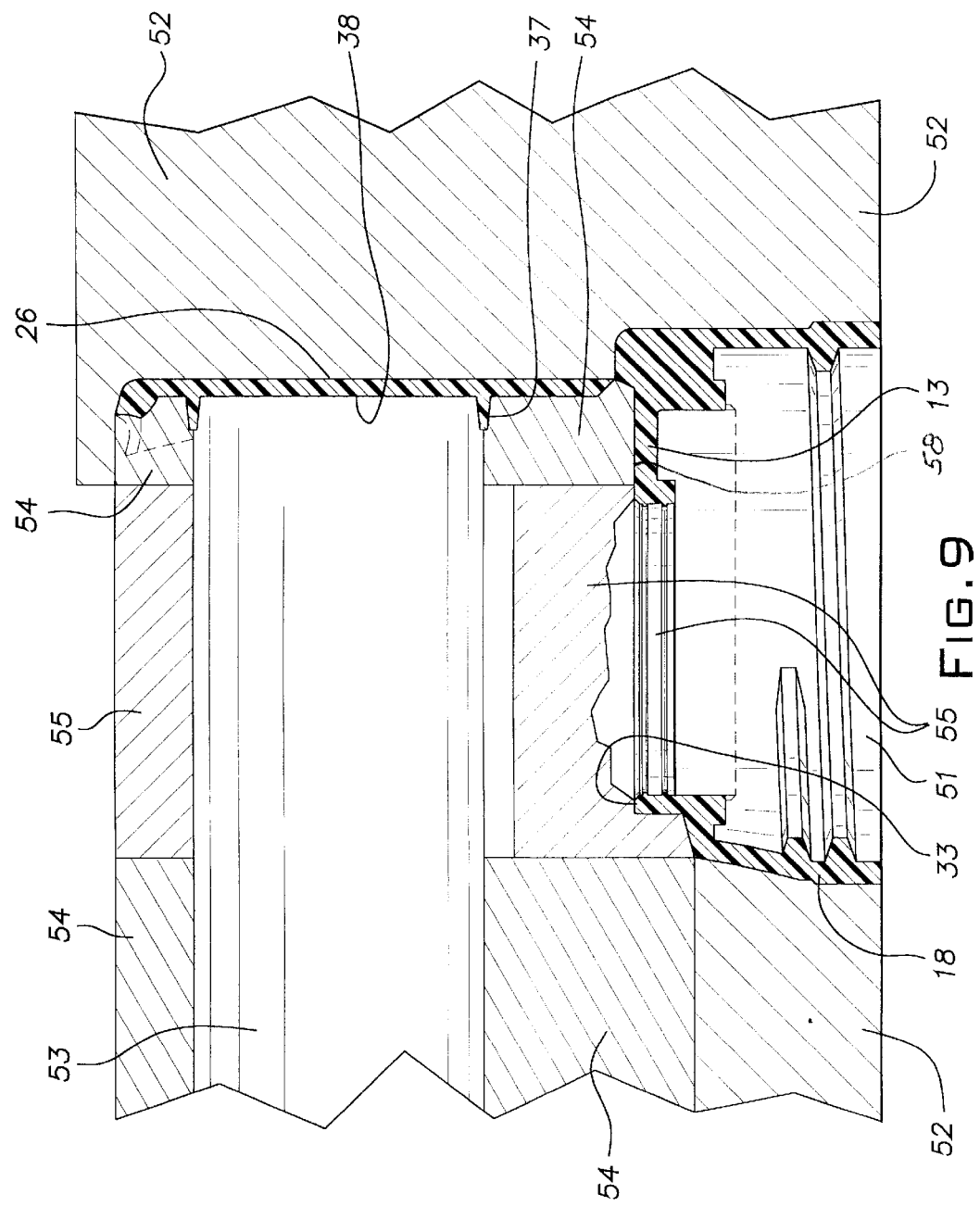
FIG. 9 is a somewhat schematic, fragmentary cross-sectional view of tooling elements for forming the cap of FIG. 1.

FIG. 9 schematically illustrates tooling for injection-molding the cap 10. The tooling elements include a core 51 through which the cavity forming the cap 10 is gated. The cap skirt 18 is surrounded by a cavity block 52. The upper face of the flap 26 and adjacent portions of the end wall 13 are formed by the cavity block 52. A major portion of the end wall-13 and peripheral portions of the underside of the flap including the outward sides of the plug wall 37 are formed by a master slide 54. The upper edge 33 and the interior surfaces of the spout 29 are formed by a primary subslide 55. The inner surface of the plug wall 37 and the included underside surface of the flap area 38 are formed by a secondary subslide 53.

The core 51, cavity block 52, master slide 54, primary subslide 55 and secondary subslide 53 are positioned relative to one another as shown in FIG. 9 at the beginning of a molding cycle. When molten thermoplastic material forming the cap has been injected into the mold cavity space bounded by these tooling elements and has solidified sufficiently, these elements are separated from the cap surfaces to release the cap. The subslides 55 and 53 are carried on and move in short transnational strokes relative to the master slide 54. The master slide 54 moves laterally with respect to the molding machine platen and axis of the cap 10; the primary subslide 55 moves perpendicularly to the master slide movement and the secondary subslide moves parallel to the master slide movement. Suitable devices well known in the art including connecting links, cams, springs and piston and cylinder actuators responsive to the opening movement of the molding machine platen are used to produce the following sequence of movement of the tooling elements. First, the subslide 55 is retracted in the axial or upward direction as shown in FIG. 9 into the main or master slide 54 so that it moves completely out of the spout 29 and opening 28. At the same time, the secondary subslide 53 retracts laterally to clear the plug wall 37. Next, the main slide 54 moves laterally horizontally to the left in FIG. 9 carrying the primary subslide 55 and secondary subslide 53 with it. Note that the cap molding surface areas 58 of the main slide adjacent the hinge 27 lie axially above the upper edge 33 of the spout 29 so that there is no interference between these bodies which would prevent this lateral motion. This geometry may be achieved by slanting the deck 14 as shown or by stepping this area so that it has a higher elevation adjacent the hinge than at the area of the spout. The main slide 54 is caused to move laterally a distance away from the flap 26 sufficient to completely withdraw its surfaces that form the underside of the flap out of any recesses of the flap. Thereafter, the cavity block 52, carrying the main slide 54 and the subslide 55 is moved axially away from the core 51 to free the cap 10 for stripping from the core 51. The dashed lines in FIG. 1 indicate the parting lines between the primary subslide 55 and master slide 54. The sequence of movement of the tooling parts is reversed from that described above when the mold is closed for the next molding cycle. The master slide 54 and secondary subslide 53 provide for escape of air between their mating surfaces to ensure a complete filling of the mold cavity zone forming the plug wall 37.

From the foregoing discussion and reference to FIG. 9, it will be seen that the cap 10 can be advantageously molded with the flap open (at a position that is generally parallel to the axis of the cap 10 or perpendicular to the plane of a sealing surface area 43 or 44) and with the axially extending spout 29. By molding the cap 10 with the flap 26 open, the hydraulic forces and area needed on the molding machine are reduced and, therefore, more cavities can be provided on a given tonnage capacity molding machine.

Figure 8:
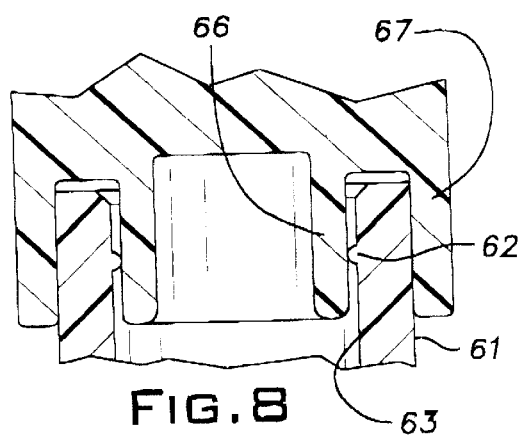
FIG. 8 is an enlarged fragmentary cross-sectional view of a dispensing spout of the cap of FIG. 7.
Figure 7:
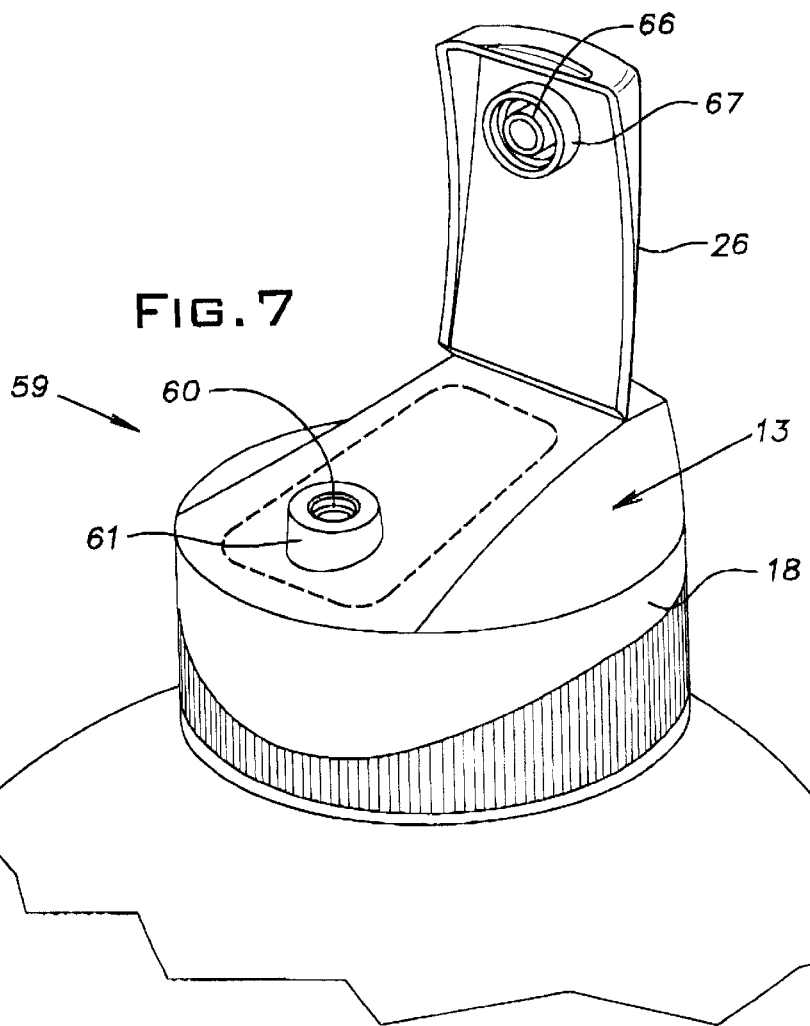
FIG. 7 is an enlarged front perspective view of a second embodiment of the invention.

FIGS. 7 and 8 illustrate a second embodiment of the invention. In this embodiment, parts corresponding to like parts in the embodiment of FIGS. 1–6 have been identified with the same numerals. A dispensing aperture 60 is disposed in the end wall 13. The aperture 60 is relatively small and is preferably circular in form. A circular spout 61 surrounds the aperture 60 and extends upwardly from the end wall 13. The spout 61 is generally cylindrical in form but may have external or internal draft angles if desired. The spout 61 has an internal seal bead 62 extending circumferentially along an inner surface 63 of the spout (FIG. 8). The flap 26 has a hollow cylindrical plug 66 arranged to fit into the spout 61 when the flap 26 is closed. The plug 66 is dimensioned to fit into the sealing bead 62 with sufficient interference to provide a fluid-tight seal therebetween. A cylindrical skirt 67 on the flap 26 is concentric with the plug 66 and is proportioned to fit snuggly over the spout 61 to provide a secondary, preferably fluid tight, seal for the aperture 60 when the flap 26 is closed onto the end wall 13. The cap 59 of FIGS. 7 and 8 can be molded with the same tooling arrangement described in connection with FIG. 9. The dotted lines in FIG. 7 represent the parting lines between a subslide and a main slide. The cap 59 can be used with viscous liquids and/or squeezable containers.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. For example, the invention can be employed with closures that have other configurations in plan view, besides round, such as square, rectangular, or oval. The closure can be attached to a container, other than by screw threads, such as by a push-on or push-in fit or by an adhesive or welding process. The aperture in the end wall can, if desired or necessary, be smaller in cross-section than the cross-sectional area of the spout. Accordingly, the patent is not to be limited in scope and effect to the specific embodiments herein shown and described nor in any other way that is inconsistent with the extent to which the progress in the art has been advanced by the invention.

What is claimed is:

1. A one-piece thermoplastic screw-on closure for dispensing liquids from a bottle comprising an end wall and a generally cylindrical skirt depending from the end wall, the skirt having internal threads for mating with the external threads on the neck of the bottle, the end wall having a central region in which is formed an elongated dispensing aperture, the end wall having an underside on which is formed a circumferentially continuous bottle sealing surface area lying in a plane perpendicular to the axis of the cylindrical skirt, a flap for opening and closing the aperture, the flap being pivotally joined to the end wall by a living hinge, the axis of the hinge being generally perpendicular to the lengthwise direction of the aperture, the end wall having a first elevation above the plane of the sealing surface area adjacent an end of the aperture distal from the hinge and a second elevation above the plane of the sealing surface area greater than the first elevation adjacent an end of the aperture proximal to the hinge, the hinge having an elevation above the plane of the sealing surface area at least as high as said second elevation, a spout surrounding said aperture, the spout having an elevation adjacent the distal end of the aperture substantially greater than the first elevation and less than the elevation of said hinge, the flap including a hollow plug proportioned to fit into said spout and close said aperture in a fluid-tight manner.

2. A one-piece thermoplastic screw-on closure as set forth in claim 1, wherein the cap is molded with the flap generally upright and the hollow plug has a peripherally continuous wall molded by separate tool elements that extend along the periphery of the wall.

3. A one-piece thermoplastic screw-on closure as set forth in claim 1, wherein the hinge has a notch running lengthwise and being relatively small in comparison to the thickness of the hinge, whereby the notch ensures a precise location of the folding action of the hinge.

4. A one-piece injection-molded thermoplastic cap for dispensing liquids from a container comprising an end wall, a sealing surface area adjacent a periphery of the end wall for sealing a container, a dispensing opening in the end wall, a spout surrounding the opening, the spout extending upwardly from the end wall a distance substantially greater than the nominal wall thickness of the cap, a flap for opening and closing the aperture, a flap being pivotal on a living hinge on the end wall that is spaced inwardly from the periphery of the end wall.

5. A cap as set forth in claim 4, wherein the hinge lies in a plane generally parallel to a plane represented by said sealing surface area.

6. A cap as set forth in claim 5, wherein the hinge has a small notch extending along its length to assure that the hinge folds precisely at the notch.

7. A cap as set forth in claim 5, wherein said spout has an upper edge, said hinge being disposed in a plane above said upper spout edge.

8. A cap as set forth in claim 7, wherein said spout edge lies in a plane generally parallel to the plane of said sealing surface area.

9. A cap as set forth in claim 5, wherein the end wall surrounding said opening is inclined downwardly toward the plane of said sealing surface area with increasing distance from said hinge.

10. A cap as set forth in claim 4, wherein said end wall and sealing surface area are generally circular.

11. A cap as set forth in claim 10, including a cylindrical skirt depending from the periphery of said end wall.

12. A cap as set forth in claim 11, wherein said skirt has internal threads.

13. A cap as set forth in claim 12, wherein the sealing surface area is configured to provide a plug fit on the interior of a container mouth.

14. A cap as set forth in claim 4, wherein the flap has a wall formation for stopping fluid flow out of the opening when the flap is in a closed position adjacent the end wall.

15. A cap as set forth in claim 14, wherein said wall formation has the form of a hollow plug.

16. A cap as set forth in claim 15, wherein the hollow plug wall formation fits into the spout.

17. A cap as set forth in claim 16, wherein the plug wall formation forms a liquid-tight seal with a wall of the spout.

18. A cap as set forth in claim 17, wherein the wall formation is molded by mating tool elements that ensure complete fill in this zone of the cap by venting of air between these mating elements.

19. A cap as set forth in claim 4, wherein the spout is generally circular in a cross-sectional plane parallel to the plane of the sealing surface area.

20. A cap as set forth in claim 19, wherein the flap has a cylindrical formation for sealing the spout.

21. A cap as set forth in claim 20, wherein the flap has concentric cylindrical formations for sealing the spout.

22. A cap as set forth in claim 4, wherein said opening is elongated in a direction generally perpendicular to the hinge.

23. A cap as set forth in claim 22, wherein said opening is generally pear-shaped, with the minor end of the opening being proximal to the hinge.

* * * * *